United States Patent
Chen et al.

[19]

[11] Patent Number: 6,065,450

[45] Date of Patent: May 23, 2000

[54] HYDRAULICALLY-ACTUATED FUEL INJECTOR WITH DIRECT CONTROL NEEDLE VALVE

[75] Inventors: Shikui K. Chen, Ann Arbor, Mich.; Gregory W. Hefler, Chillicothe, Ill.

[73] Assignee: Caterpillar Inc., Peoria, Ill.

[21] Appl. No.: 09/053,959

[22] Filed: Apr. 2, 1998

Related U.S. Application Data

[63] Continuation of application No. 08/864,606, May 28, 1997, Pat. No. 5,738,075, which is a continuation of application No. 08/707,804, Aug. 30, 1996, Pat. No. 5,687,693, which is a continuation-in-part of application No. 08/668,552, Jun. 21, 1996, Pat. No. 5,697,342, which is a continuation-in-part of application No. 08/489,660, Jun. 12, 1995, Pat. No. 5,673,669, which is a continuation of application No. 08/283,232, Jul. 29, 1994, Pat. No. 5,463,996.

[51] Int. Cl.[7] .................................................. F02M 37/04
[52] U.S. Cl. ............................................ 123/446; 123/496
[58] Field of Search ................................ 123/446.7, 467, 123/496; 239/88–96, 585.1

[56] References Cited

U.S. PATENT DOCUMENTS

| | | |
|---|---|---|
| Re. 33,270 | 7/1990 | Beck et al. . |
| 3,175,771 | 3/1965 | Breting . |
| 3,241,768 | 3/1966 | Croft . |
| 3,361,161 | 1/1968 | Schwartz . |
| 3,443,760 | 5/1969 | Simmons . |
| 3,450,353 | 6/1969 | Eckert . |
| 3,532,121 | 10/1970 | Sturman et al. . |
| 3,570,806 | 3/1971 | Sturman et al. . |
| 3,570,807 | 3/1971 | Sturman et al. . |
| 3,570,833 | 3/1971 | Sturman et al. . |
| 3,592,568 | 7/1971 | Fenne . |
| 3,604,959 | 9/1971 | Sturman . |
| 3,661,130 | 5/1972 | Eheim . |
| 3,683,239 | 8/1972 | Sturman . |
| 3,742,918 | 7/1973 | Murtin et al. . |
| 3,743,898 | 7/1973 | Murtin et al. . |
| 3,821,967 | 7/1974 | Sturman et al. . |
| 3,989,066 | 11/1976 | Sturman et al. . |
| 4,040,569 | 8/1977 | Knapp . |
| 4,064,855 | 12/1977 | Johnson . |
| 4,096,995 | 6/1978 | Klomp . |
| 4,107,546 | 8/1978 | Sturman et al. . |
| 4,108,419 | 8/1978 | Sturman et al. . |
| 4,114,647 | 9/1978 | Sturman et al. . |
| 4,120,456 | 10/1978 | Kimura et al. . |
| 4,129,255 | 12/1978 | Bader, Jr. et al. . |
| 4,192,466 | 3/1980 | Tanasawa et al. . |
| 4,258,674 | 3/1981 | Wolff . |

(List continued on next page.)

FOREIGN PATENT DOCUMENTS 411823781 12/1991 Germany .

OTHER PUBLICATIONS

Beck, et al; "Direct Digital Control of Electronic Unit Injectors"; 12 pgs. Feb. 27, 1984 U.S.

Beck, et al; "Injection Rate Shaping and High Speed Combustion Analysis . . . " 20 pgs. Feb. 26, 1990 U.S.

BKM, Inc.; "Servo Jet Electronic Fuel Injection HSV High Speed Solenoid Valves"; 4 pgs.; 1985 U.S.

(List continued on next page.)

*Primary Examiner*—Thomas N. Moulis
*Attorney, Agent, or Firm*—Michael McNeil

[57] ABSTRACT

A fuel injection system includes a plurality of hydraulically actuated fuel injectors with direct control needle valves. Each injector has an injector body that defines an actuation fluid inlet, a fuel supply passage and a needle control chamber. A needle valve member is movably mounted in the injector body and has a closing hydraulic surface exposed to pressure in the needle control chamber. Each injector also includes a relatively slow moving actuation fluid control valve member and a relatively fast moving needle control valve member. A source of low pressure fluid is connected to the fuel supply passage, and a source of high pressure fluid is connected to the actuation fluid inlet.

20 Claims, 9 Drawing Sheets

U.S. PATENT DOCUMENTS

| | | |
|---|---|---|
| 4,269,360 | 5/1981 | Kopse . |
| 4,343,280 | 8/1982 | Luscomb . |
| 4,392,612 | 7/1983 | Deckard et al. . |
| 4,409,638 | 10/1983 | Sturman et al. . |
| 4,417,557 | 11/1983 | Walter . |
| 4,440,132 | 4/1984 | Terada et al. . |
| 4,471,740 | 9/1984 | Jourde et al. . |
| 4,482,094 | 11/1984 | Knape . |
| 4,498,625 | 2/1985 | Schechter . |
| 4,501,290 | 2/1985 | Sturman et al. . |
| 4,516,600 | 5/1985 | Sturman et al. . |
| 4,541,454 | 9/1985 | Sturman et al. . |
| 4,544,096 | 10/1985 | Burnett . |
| 4,561,701 | 12/1985 | Fujii et al. . |
| 4,568,021 | 2/1986 | Deckard et al. . |
| 4,580,598 | 4/1986 | Itoh . |
| 4,586,656 | 5/1986 | Wich . |
| 4,603,671 | 8/1986 | Yoshinaga et al. . |
| 4,618,095 | 10/1986 | Spoolstra . |
| 4,628,881 | 12/1986 | Beck et al. . |
| 4,635,854 | 1/1987 | Ishibashi . |
| 4,671,232 | 6/1987 | Stumpp et al. . |
| 4,681,080 | 7/1987 | Schukoff . |
| 4,709,679 | 12/1987 | Djordjevic et al. . |
| 4,714,066 | 12/1987 | Jordan . |
| 4,721,253 | 1/1988 | Noguchi et al. . |
| 4,777,921 | 10/1988 | Miyaki et al. . |
| 4,782,807 | 11/1988 | Takahashi . |
| 4,811,221 | 3/1989 | Sturman et al. . |
| 4,813,601 | 3/1989 | Schwerdt et al. . |
| 4,831,989 | 5/1989 | Haines . |
| 4,838,232 | 6/1989 | Wich . |
| 4,840,160 | 6/1989 | Zipprath et al. . |
| 4,870,940 | 10/1989 | Filippi et al. . |
| 4,934,599 | 6/1990 | Hasagawa . |
| 4,946,103 | 8/1990 | Ganser . |
| 4,951,631 | 8/1990 | Eckert . |
| 4,951,874 | 8/1990 | Ohnishi et al. . |
| 4,957,085 | 9/1990 | Sverdlin . |
| 4,964,571 | 10/1990 | Taue et al. . |
| 4,969,600 | 11/1990 | Nicol . |
| 4,993,637 | 2/1991 | Kanesaka . |
| 5,007,584 | 4/1991 | Rossignol . |
| 5,033,442 | 7/1991 | Perr et al. . |
| 5,046,472 | 9/1991 | Linder . |
| 5,072,882 | 12/1991 | Taue et al. . |
| 5,082,180 | 1/1992 | Kubo et al. . |
| 5,094,215 | 3/1992 | Gustafson . |
| 5,109,822 | 5/1992 | Martin . |
| 5,121,730 | 6/1992 | Ausman et al. . |
| 5,133,645 | 7/1992 | Crowley et al. . |
| 5,141,164 | 8/1992 | Ohno et al. . |
| 5,143,291 | 9/1992 | Grinsteiner . |
| 5,155,461 | 10/1992 | Teerman et al. . |
| 5,201,295 | 4/1993 | Kimberley et al. . |
| 5,221,046 | 6/1993 | Timmer . |
| 5,230,613 | 7/1993 | Hilsbos et al. . |
| 5,235,954 | 8/1993 | Sverdlin . |
| 5,265,804 | 11/1993 | Brunel . |
| 5,271,563 | 12/1993 | Cerny et al. . |
| 5,295,469 | 3/1994 | Kariya et al. . |
| 5,335,852 | 8/1994 | Muntean et al. . |
| 5,347,970 | 9/1994 | Pape et al. . |
| 5,353,991 | 10/1994 | De Nagel et al. . |
| 5,370,095 | 12/1994 | Yamaguchi et al. . |
| 5,441,028 | 8/1995 | Felhofer . |
| 5,477,828 | 12/1995 | Barnes . |
| 5,485,820 | 1/1996 | Iwaszkiewicz . |
| 5,485,957 | 1/1996 | Sturman . |
| 5,526,791 | 6/1996 | Timmer et al. . |
| 5,585,547 | 12/1996 | Sturman et al. . |
| 5,720,261 | 2/1998 | Sturman ................................. 123/446 |
| 5,738,075 | 4/1998 | Chen et al. ............................ 123/446 |

OTHER PUBLICATIONS

Cihocki, et al; "Latest Findings in Development of High–Speed Direct Injection Diesel Engines in Passenger Vehicles"; 30 pgs. Apr. 28, 1994 Germ.

Dolenc; "The Injection Equipment of Future High–Speed DI Diesel Engines With Respect . . . "; 10 pgs. Feb. 7, 1990 Great Britain.

Egger, et al; "Common Rail Injection Systems For Diesel Engines—Analysis, Potential, Future"; 28 pgs.; Apr. 28, 1994 Germany.

Miyaki, et al; "Development of New Electronically Controlled Fuel Injection System ECD–U2 For Diesel Engines"; 17 pgs.; 1991.

Prescher, et al; "Common Rail Injection Systems With Characteristics Independent of Engine Speed . . . "; 39 pgs. Apr. 28, 1994 Germany.

Racine, et al; "Application of a High Flexible Electronic Injection System To A Heavy Duty Diesel Engine". 14 pgs.; Feb. 25, 1991 U.S.

Tow, et al; "Reducing Particulate and NOx Emissions By Using Emissions By Using Multiple Injections In A Heavy Duty . . . " 17 pgs.; Apr. 28, 1994 U.S.

Tow; "The Effect of Multiple Pulse Injection, Injection Rate and Injection Pressure On Particulate and NOx . . . " 147 pgs.; 1993 U.S.

Fig_1_

Fig_2_

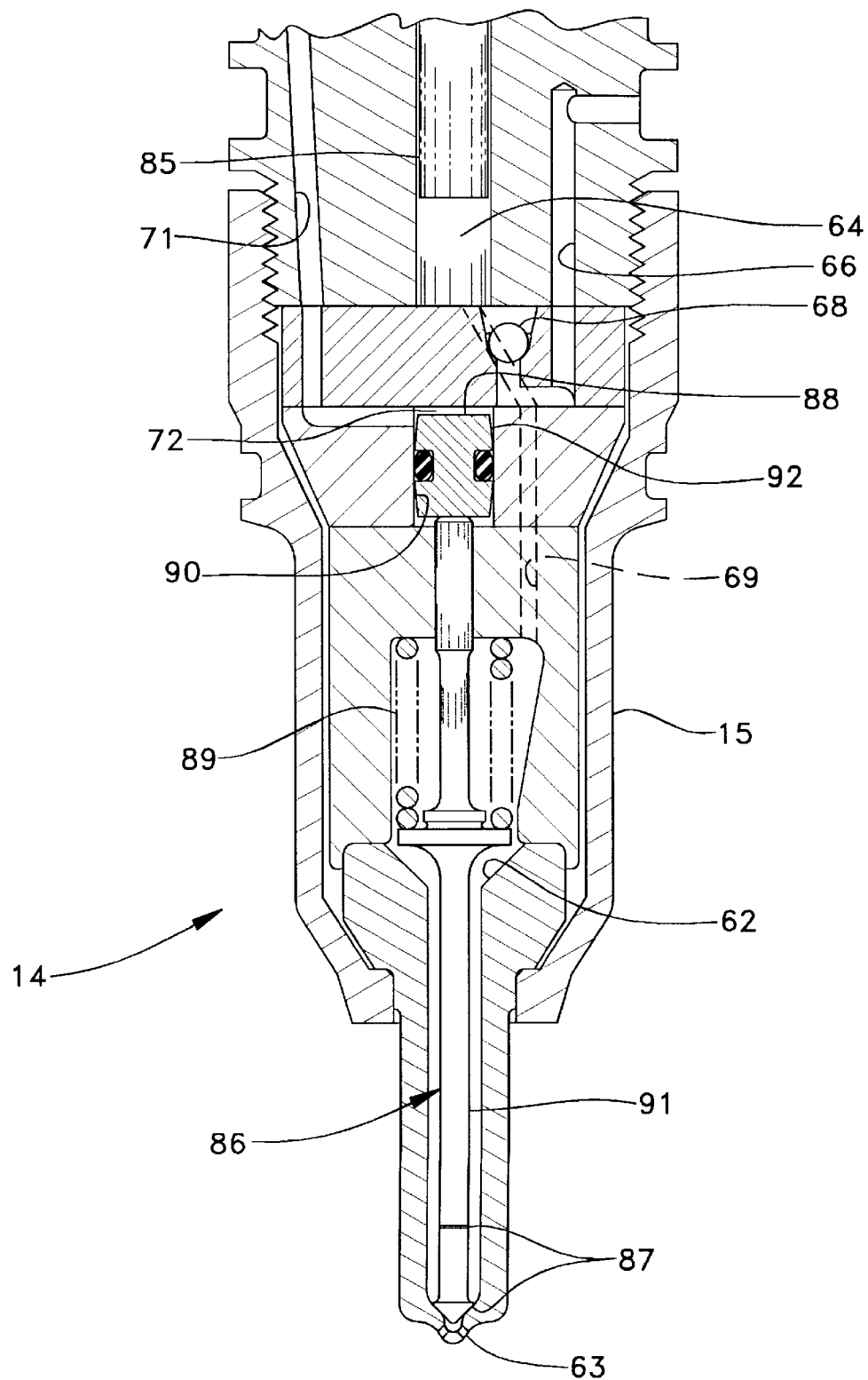
Fig_4_

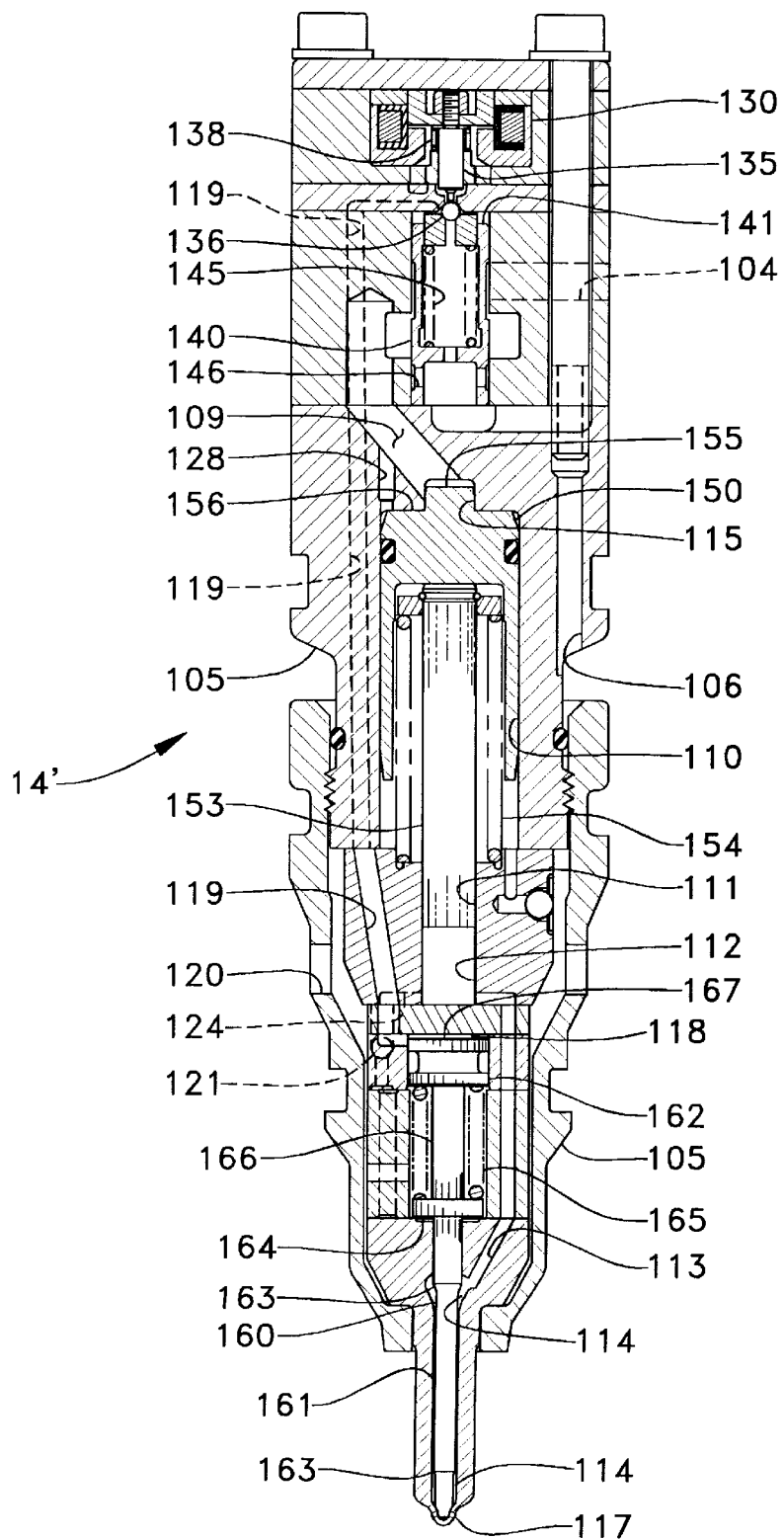
Fig_5

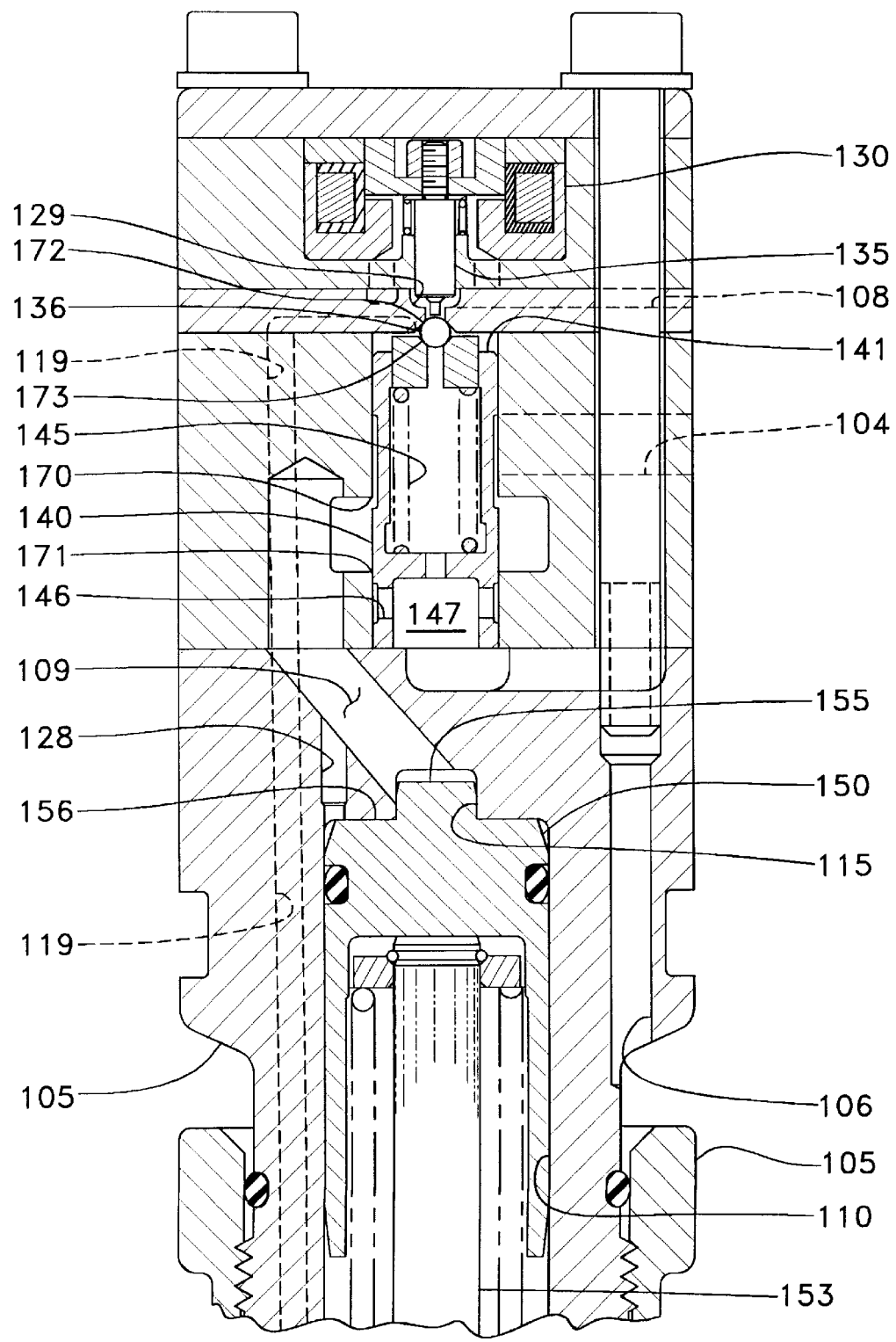
Fig_6_

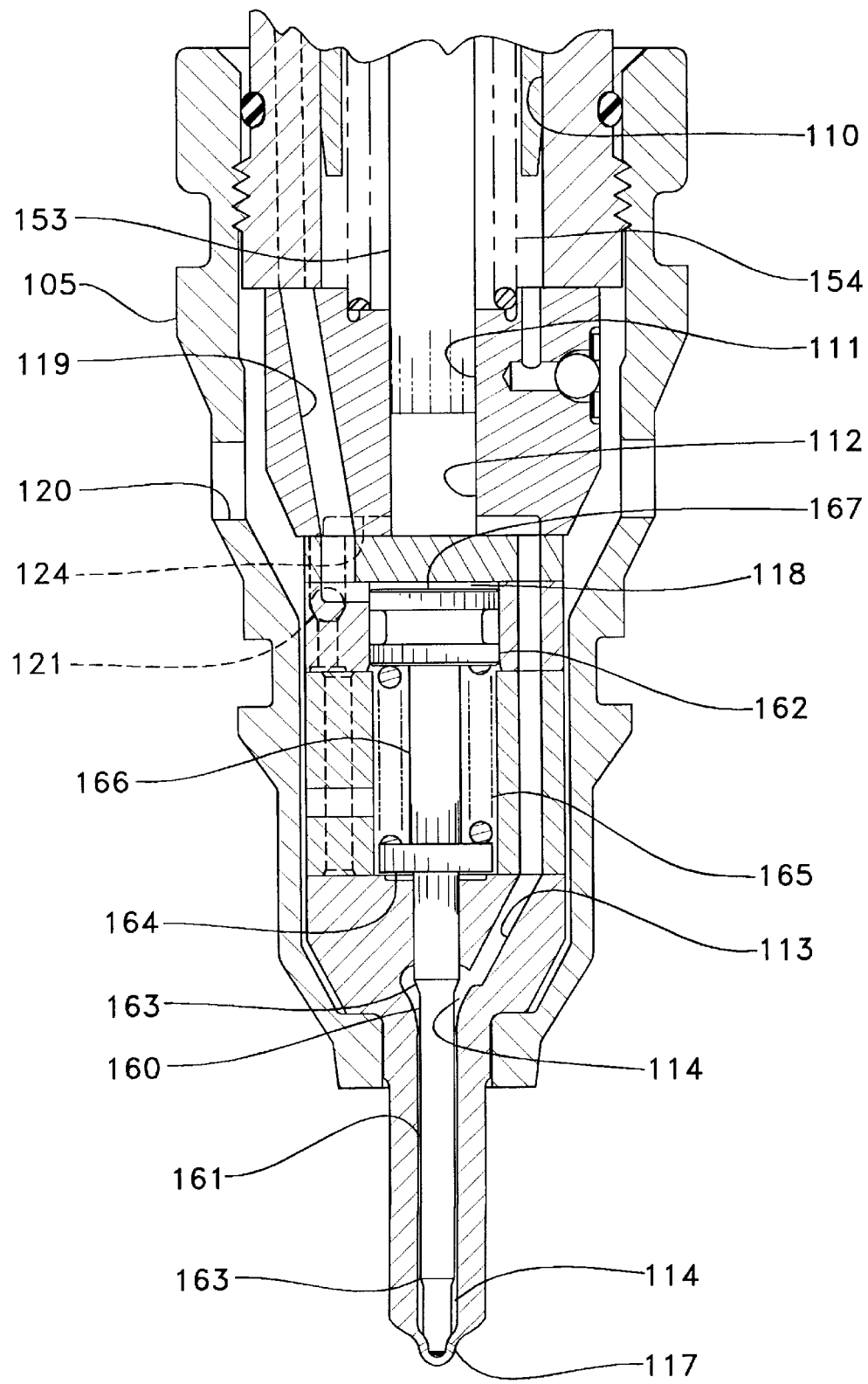

SOLENOID CURRENT (AMPS)

BALL POSITION

SPOOL POSITION

INTENSIFIER PISTON POSITION

MASS INJECTION RATE

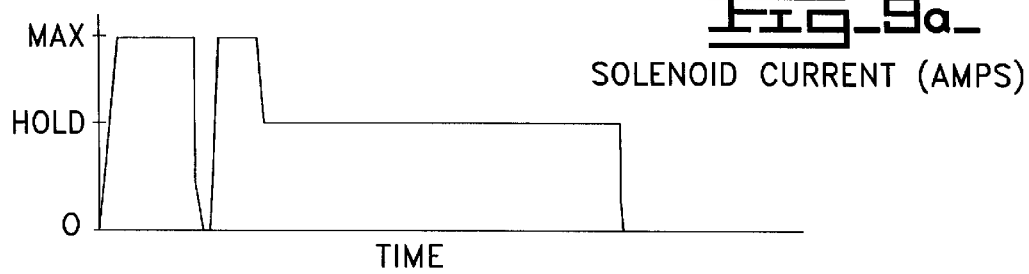
Fig_9a_
SOLENOID CURRENT (AMPS)
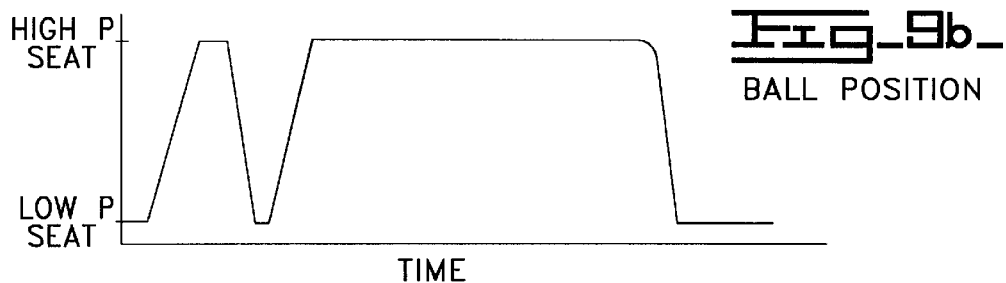
Fig_9b_
BALL POSITION
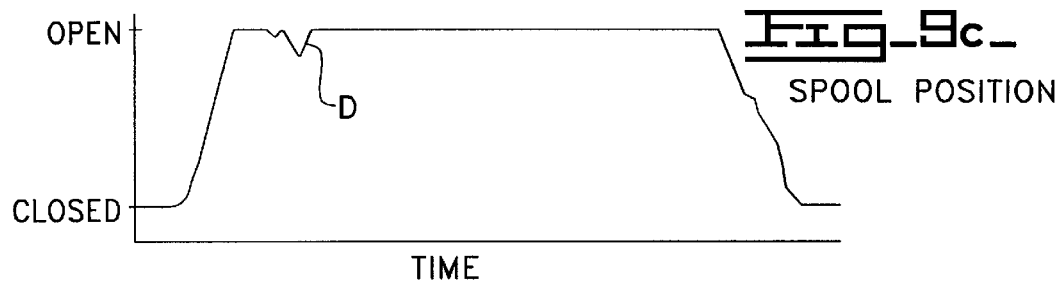
Fig_9c_
SPOOL POSITION
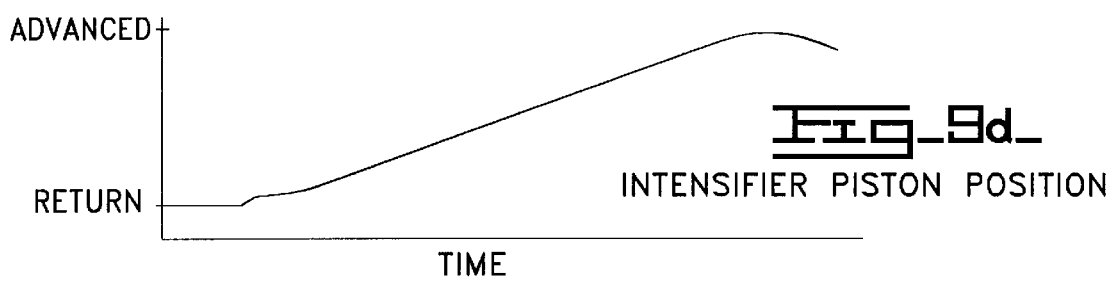
Fig_9d_
INTENSIFIER PISTON POSITION
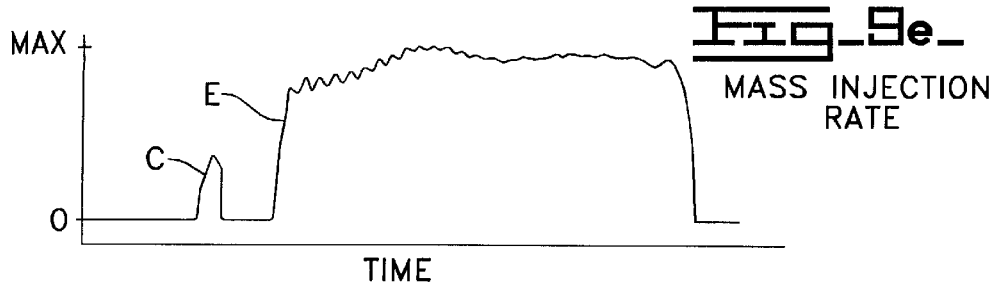
Fig_9e_
MASS INJECTION RATE

HYDRAULICALLY-ACTUATED FUEL INJECTOR WITH DIRECT CONTROL NEEDLE VALVE

RELATION TO OTHER PATENT APPLICATIONS

This application is a continuation of application Ser. No. 08/864,606, filed May 28, 1997, with the same title as above, (now U.S. Pat. No. 5,738,075), which was a continuation of application Ser. No. 08/707,804, filed Aug. 30, 1996, with the same title as above (now U.S. Pat. No. 5,687,693), which was a continuation-in-part of application Ser. No. 08/668,552, filed Jun. 21, 1996, also with the same title (now U.S. Pat. No. 5,697,342), which was a continuation-in-part of application Ser. No. 08/489,660, filed Jun. 12, 1995 and entitled HYDRAULICALLY-ACTUATED FLUID INJECTOR HAVING PRE-INJECTION PRESSURIZABLE FLUID AND DIRECT-OPERATED CHECK, (now U.S. Pat. No. 5,673,669), which was a continuation of application Ser. No. 08/283,232, filed Jul. 29, 1994 with the same title (now U.S. Pat. No. 5,463,996).

TECHNICAL FIELD

The present invention relates generally to fuel injection, and more particularly to hydraulically-actuated fuel injectors with direct control needle valve members, and fuel injection systems using same.

BACKGROUND ART

Known hydraulically-actuated fuel injection systems and/or components are shown, for example, in U.S. Pat. No. 5,121,730 issued to Ausman et al. on Jun. 16, 1992; U.S. Pat. No. 5,271,371 issued to Meints et al. on Dec. 21, 1993; and U.S. Pat. No. 5,297,523 issued to Hafner et al. on Mar. 29, 1994. In these hydraulically actuated fuel injectors, a spring biased needle check opens to commence fuel injection when pressure is raised by an intensifier piston/plunger assembly to a valve opening pressure. The intensifier piston is acted upon by a relatively high pressure actuation fluid, such as engine lubricating oil, when a solenoid driven actuation fluid control valve opens the injector's high pressure inlet. Injection is ended by deactivating the solenoid to release pressure above the intensifier piston. This in turn causes a drop in fuel pressure causing the needle check to close under the action of its return spring and end injection. While these hydraulically actuated fuel injectors have performed magnificently over many years, there remains room for improvement, especially in the area of shaping an injection rate trace from beginning to end to precisely suit a set of engine operating conditions.

Over the years, engineers have discovered that engine emissions can be significantly reduced at certain operating conditions by providing a particular injection rate trace. In many cases emissions are improved when the initial injection rate is controllable, and when there is a nearly vertical abrupt end to injection. While these prior hydraulically actuated fuel injection systems have some ability to control the injection rate shape, there remains room to improve the ability to control injection rate shape with hydraulically actuated fuel injection systems.

The present invention is intended to improve the ability of hydraulically actuated fuel injectors to reliably produce better injection rate shapes during each injection event.

DISCLOSURE OF THE INVENTION

A hydraulically actuated fuel injector includes an injector body that defines an actuation fluid inlet, an actuation fluid cavity, a nozzle outlet, and a needle control chamber. A solenoid is attached to the injector body. A first valve member is mounted in the injector body and movable in response to the solenoid between a first position in which the actuation fluid inlet is open to the actuation fluid cavity and a second position in which the actuation fluid inlet is closed to the actuation fluid cavity. A needle valve member is mounted in the injector body and movable between an open position in which the nozzle outlet is open and a closed position in which the nozzle outlet is blocked. The needle valve member has a closing hydraulic surface exposed to pressure in the needle control chamber. A second valve member is mounted in the injector body and movable in response to said solenoid between an off position in which the needle control chamber is opened to a source of high pressure fluid and an on position in which the needle control chamber is opened to a low pressure passage. The second valve member is moveable from its on position to its off position and back to its on position before the first valve member can move from its first position to a position that closes said actuation fluid inlet to said actuation fluid cavity.

In another embodiment, a fuel injection system includes a plurality of hydraulically actuated fuel injectors with direct control needle valves. Each injector has an injector body that defines an actuation fluid inlet, a fuel supply passage and a needle control chamber. A needle valve member is movably mounted in the injector body and has a closing hydraulic surface exposed to pressure in the needle control chamber. Each injector also includes a relatively slow moving actuation fluid control valve member and a relatively fast moving needle control valve member. A source of low pressure fluid is connected to the fuel supply passage, and a source of high pressure fluid is connected to the actuation fluid inlet.

BRIEF DESCRIPTION OF THE DRAWINGS

FIG. 4 is a partial sectioned side elevational view of the lower portion of the injector shown in FIG. 2.

FIG. 5 is a sectioned side elevational view of a fuel injector according to the present invention.

FIG. 6 is a partial sectioned side elevational view of an upper portion of the fuel injector shown in FIG. 5.

FIG. 7 is a partial sectioned side elevational view of the lower portion of the injector shown in FIG. 5.

FIGS. 9a–e are a group of curves showing component positions and injection parameters versus time over a "pilot plus square" injection event.

BEST MODE FOR CARRYING OUT THE INVENTION

Figure 1:
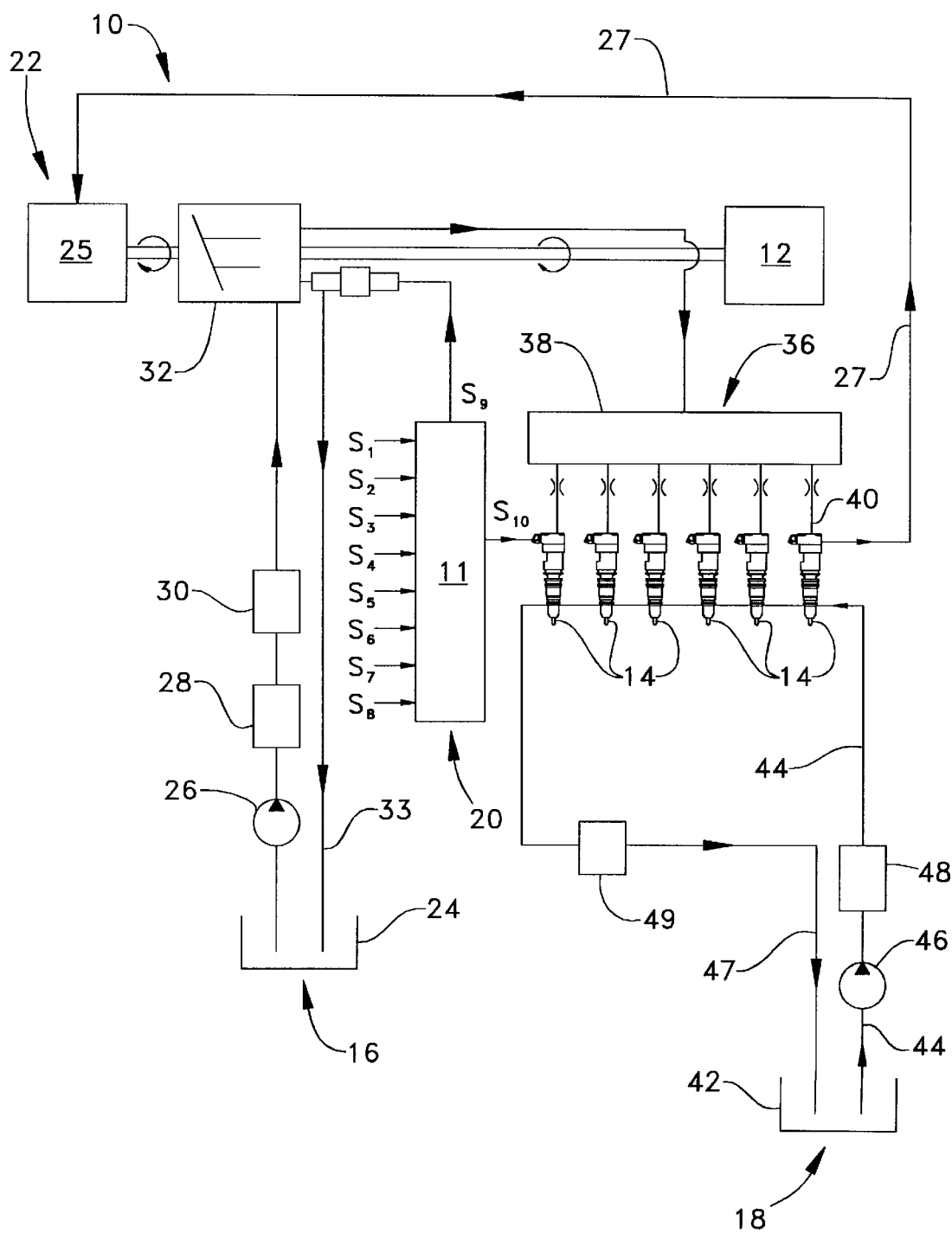
FIG. 1 is a schematic view of a fuel injection system according to the present invention.

Referring now to FIG. 1, there is shown an embodiment of a hydraulically-actuated electronically-controlled fuel injection system 10 in an example configuration as adapted for a direct-injection diesel-cycle internal combustion engine 12. Fuel system 10 includes one or more hydraulically-actuated electronically-controlled fuel injectors 14, which are adapted to be positioned in a respective cylinder head bore of engine 12. Fuel system 10 includes an apparatus or means 16 for supply actuating fluid to each injector 14, an apparatus or means 18 for supplying fuel to each injector, a computer 20 for electronically controlling the fuel injection system and an apparatus or means 22 for re-circulating actuation fluid and for recovering hydraulic energy from the actuation fluid leaving each of the injectors.

The actuating fluid supply means 16 preferably includes an actuating fluid sump 24, a relatively low pressure actuating fluid transfer pump 26, an actuating fluid cooler 28, one or more actuation fluid filters 30, a high pressure pump 32 for generating relatively high pressure in the actuation fluid and at least one relatively high pressure actuation fluid manifold 36. A common rail passage 38 is arranged in fluid communication with the outlet from the relatively high pressure actuation fluid pump 32. A rail branch passage 40 connects the actuation fluid inlet of each injector 14 to the high pressure common rail passage 38.

Actuation fluid leaving the actuation fluid drain 52, 54 (see FIG. 2) of each injector 14 enters a re-circulation line 27 that carries the same to the hydraulic energy re-circulating or recovering means 22. A portion of the re-circulated actuation fluid is channeled to high pressure actuation fluid pump 32 and another portion is returned to actuation fluid sump 24 via re-circulation line 33.

Any available engine fluid is preferably used as the actuation fluid in the present invention. However, in the preferred embodiments, the actuation fluid is engine lubricating oil and the actuation fluid sump 24 is an engine lubrication oil sump. This allows the fuel injection system to be connected as a parasitic subsystem to the engine's lubricating oil circulation system. Alternatively, the actuation fluid could be fuel provided by a fuel tank 42 or another source, such as coolant fluid, etc.

The fuel supply means 18 preferably includes a fuel tank 42, a fuel supply passage 44 arranged in fluid communication between fuel tank 42 and the fuel inlet 60 (FIG. 2) of each injector 14, a relatively low pressure fuel transfer pump 46, one or more fuel filters 48, a fuel supply regulating valve 49, and a fuel circulation and return passage 47 arranged in fluid communication between injectors 14 and fuel tank 42.

The computer 20 preferably includes an electronic control module 11 which controls 1) the fuel injection timing; 2) the total fuel injection quantity during an injection cycle; 3) the fuel injection pressure; 4) the number of separate injections or injection segments during each injection cycle; 5) the time intervals between the injection segments; 6) the fuel quantity of each injection segment during an injection cycle; 7) the actuation fluid pressure; and 8) any combination of the above parameters. Computer 20 receives a plurality of sensor input signals $S_1$–$S_8$, which correspond to known sensor inputs, such as engine operating condition, load, etc., that are used to determine the precise combination of injection parameters for a subsequent injection cycle. In this example, computer 20 issues control signal $S_9$ to control the actuation fluid pressure and a control signal $S_{10}$ to control the fluid control valve(s) within each injector 14. Each of the injection parameters are variably controllable independent of engine speed and load. In the case of injector 14, control signal $S_{10}$ is current to the solenoid commanded by the computer.

Figure 2:
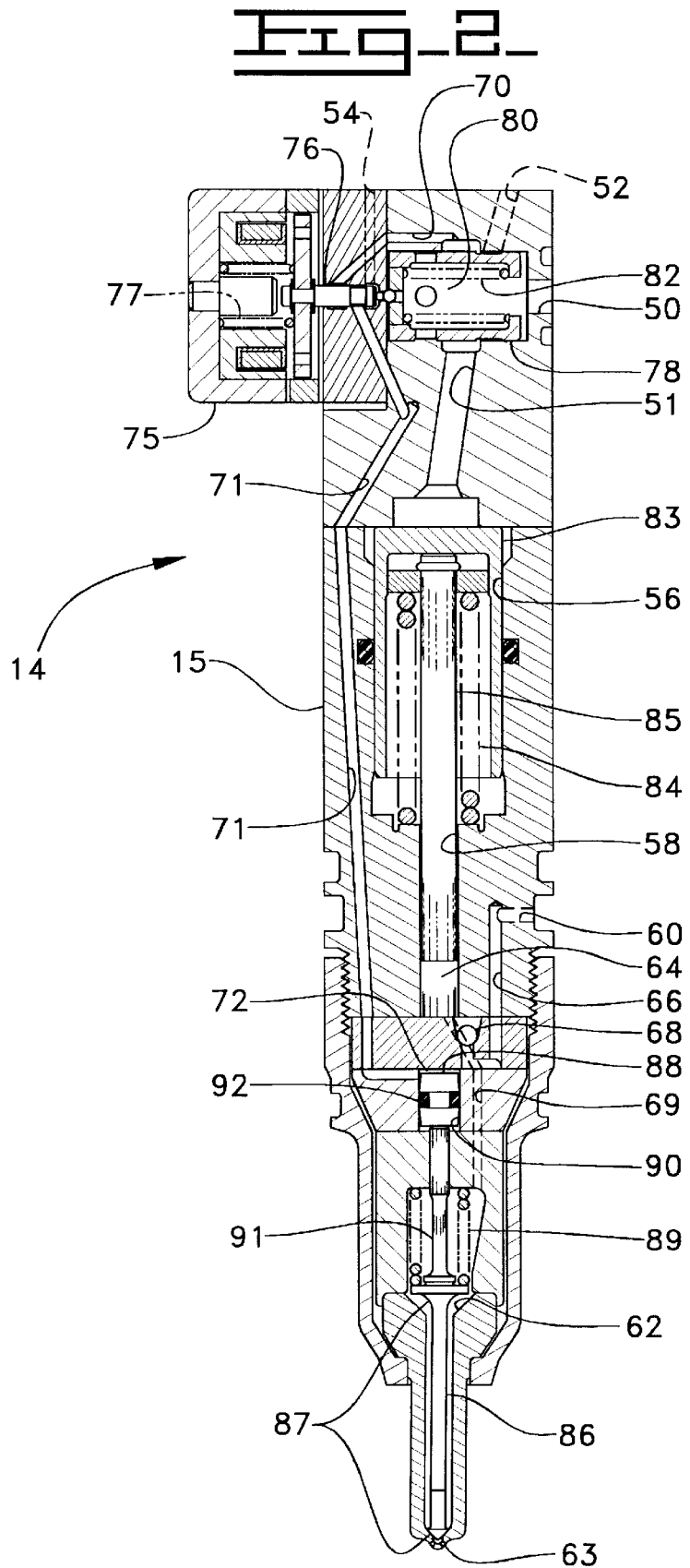
FIG. 2 is a sectioned side elevational view of a fuel injector.
Figure 3:
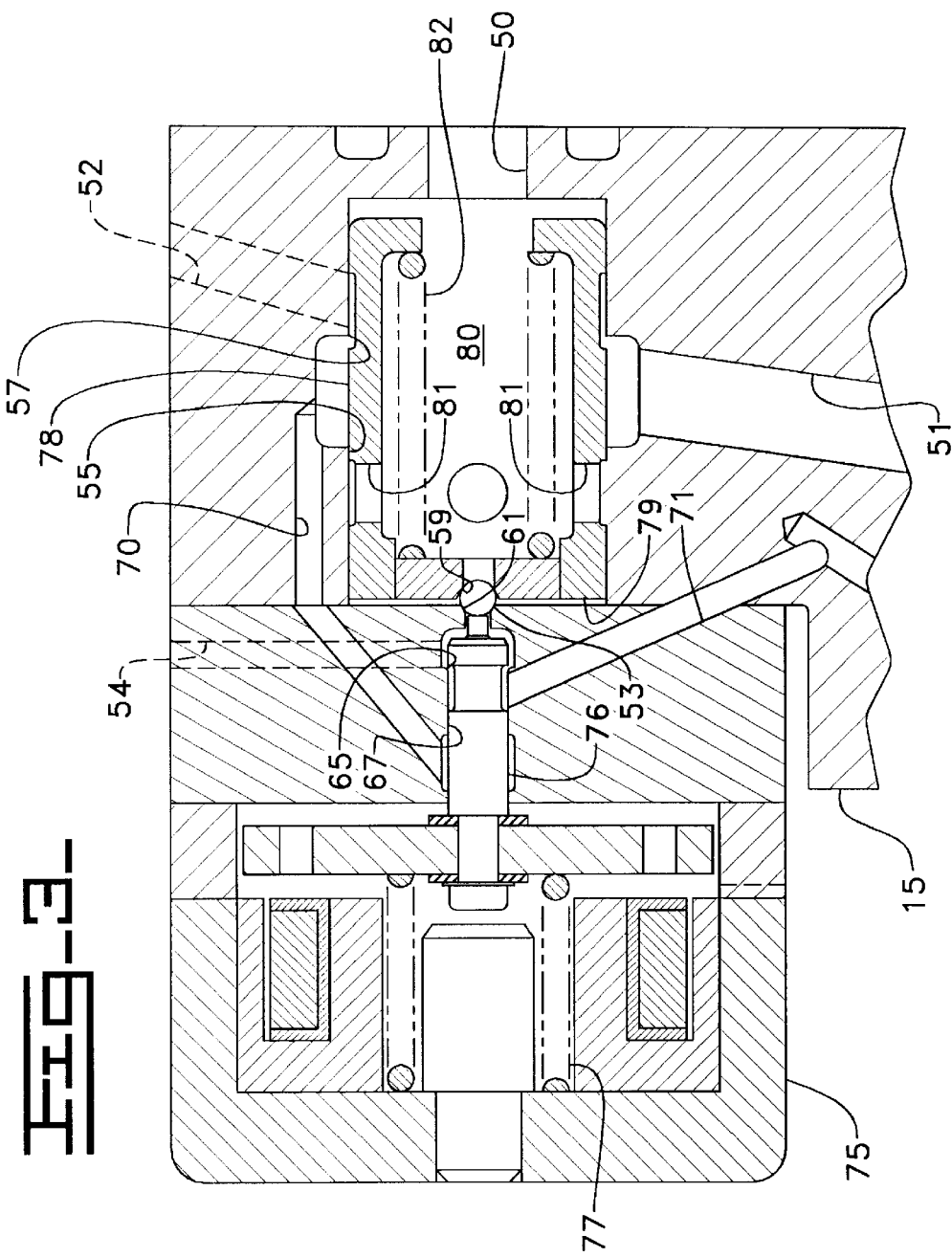
FIG. 3 is a partial sectioned side elevational view of an upper portion of the fuel injector shown in FIG. 2.

Referring now to FIGS. 2–4, a fuel injector 14 with a single three-way solenoid 75 is shown. Injector 14 includes an injector body 15 having an actuation fluid inlet 50 that is connected to a branch rail passage 40, actuation fluid drains 52 and 54 that are connected to actuation fluid recirculation line 27 and a fuel inlet 60 connected to a fuel supply passage 44. (See FIG. 1). Injector 14 includes a hydraulic means for pressurizing fuel within the injector during each injection event and a needle control valve that controls the opening and closing of nozzle outlet 63.

The hydraulic means for pressurizing fuel includes an actuation fluid control valve that alternately opens actuation fluid cavity 51 to the high pressure of actuation fluid inlet 50 or the low pressure of actuation fluid drain 52. The actuation fluid control valve includes a three-way solenoid 75 attached to a pin spool valve member 76. An intensifier spool valve member 78 responds to movement of pin spool valve member 76 to alternately open actuation fluid cavity 51 to actuation fluid inlet 50 or low pressure drain 52. The hydraulic pressurizing means also includes actuation fluid cavity 51 that opens to a piston bore 56, within which an intensifier piston 83 reciprocates between a return position (as shown) and a forward position. Injector body 15 also includes a plunger bore 58, within which a plunger 85 reciprocates between a retracted position (as shown) and an advanced position. A portion of plunger bore 58 and plunger 85 define a fuel pressurization chamber 64, within which fuel is pressurized during each injection event. Plunger 85 and intensifier piston 83 are returned to their retracted positions between injection events under the action of compression spring 84. Thus, the hydraulic means for pressurizing fuel includes the fuel pressurization chamber 64, plunger 85, intensifier piston 83, actuation fluid inlet 50, actuation fluid cavity 51 and the various components of the actuation fluid control valve, which includes solenoid 75, pin spool valve member 76, ball 53 and intensifier spool valve member 78, etc.

Fuel enters injector 14 at fuel inlet 60 and travels along fuel supply passage 66, past ball check valve 68 and into fuel pressurization chamber 64, when plunger 85 is retracting. Ball check 68 prevents the reverse flow of fuel from fuel pressurization chamber 64 into fuel supply passage 66 during the plunger's downward stroke. Unused fuel is re-circulated from each injector via a return opening 74. Pressurized fuel travels from fuel pressurization chamber 64 via a connection passage 69 to nozzle chamber 62. A needle valve member 86 moves within nozzle chamber 62 between an open position in which nozzle outlet 63 is opened and a closed position in which nozzle outlet 63 is closed. Needle valve member 86 is mechanically biased to its closed position by a compression spring 89.

Needle valve member 86 includes opening hydraulic surfaces 87 exposed to fluid pressure within nozzle chamber 62 and a closing hydraulic surface 88 exposed to fluid pressure within a needle control chamber 72. Needle valve member 86 includes a needle portion 91 and intensifier portion 92 that are shown as separate pieces for ease of manufacturing, but both portions could be machined as a single integral component.

It should be appreciated that pressurized fuel acts upon the opening hydraulic surfaces 87 whereas actuation fluid acts upon the closing hydraulic surface 88. Preferably, the closing hydraulic surface and the opening hydraulic surface are sized and arranged such that the needle valve member 86 is hydraulically biased toward its closed position when the needle control chamber is open to a source of high pressure fluid. Thus, in order to maintain direct control of needle valve member 86 despite high fuel pressure within nozzle chamber 62, there should be adequate pressure on the closing hydraulic surface 88 to maintain nozzle outlet 63 closed. When needle control chamber 72 is opened to a low pressure passage, needle valve member 86 performs as a simple check valve of a type known in the art, in that it opens when fuel pressure acting upon opening hydraulic surfaces 87 is greater than a valve opening pressure sufficient to overcome return spring 89. Thus, opening hydraulic surfaces 87 and closing hydraulic surface 88 are preferably sized and arranged such that the needle valve member is hydraulically biased toward its open position when the needle control chamber is connected to a low pressure passage and the fuel pressure within the nozzle chamber is greater than the valve opening pressure.

In this injector, pin spool valve member 76 is not only considered part of the actuation fluid control valve, but also acts as the needle control valve to alternately open actuation fluid control passage 71 to the high pressure of actuation fluid inlet 50 or the low pressure in actuation fluid drain 54. One can control the opening and closing of nozzle outlet 63 when fuel is above a valve opening pressure by controlling the exposure of closing hydraulic surface 88 to either a source of high pressure fluid or a low pressure passage. Thus, in this injector, actuation fluid drain 54 constitutes a low pressure passage and actuation fluid inlet 50 constitutes a source of high pressure fluid.

Intensifier spool valve member 78 is biased by a compression spring 82 from a closed position, as shown, toward an open position. When intensifier spool valve member 78 is in its closed position as shown, actuation fluid cavity 51 is closed to actuation fluid inlet 50, but open to low pressure actuation fluid drain 52. When intensifier spool valve member 78 moves under the action of compression spring 82 to its open position, actuation fluid cavity 51 is opened to actuation fluid inlet 50 and closed to drain 52. The position of intensifier spool valve member 78 is controlled by three position solenoid 75, which is capable of moving actuation pin spool valve member 76 between a first position, a second position, and a third position against the action of compression spring 77.

When solenoid 75 is de-energized, as shown, compression spring 77 pushes pin spool valve member 76 to the right to its first position in which actuation fluid control passage 71 is opened to second low pressure actuation fluid drain 54 past seat 65. At the same time, pin spool valve member 76 pushes ball 53 to close seat 59 and open seat 61 so that the end hydraulic surface 79 of intensifier spool valve member 78 is exposed to the low pressure of second drain 54. This causes the high pressure actuation fluid acting on the other end of intensifier spool valve member 78 to hold it in its closed position as shown against the action of compression spring 82. Thus, when solenoid 75 is de-energized, actuation fluid cavity is open to actuation fluid drain 52 and closed to actuation fluid inlet 50.

When solenoid 75 is energized with a full or pull-in current, pin spool valve member 76 is pulled to the left against its stop to a second position. When this occurs, the high pressure actuation fluid pushes ball 53 off of seat 59 to close seat 61. This causes intensifier spool valve member 78 to become hydraulically balanced and it moves toward the right to its open position under the action of compression spring 82. At the same time, pin spool valve member 76 closes control passage 71 to second drain 54 and opens actuation fluid control passage 71 to a transfer passage 70, which is open to the high pressure in actuation fluid cavity 51.

When solenoid 75 is energized with a medium or hold-in current, pin spool valve member 76 moves slightly to the right to a third position that is a sufficient distance to close actuation fluid control passage 71 to the high pressure in transfer passage 70 and re-open the same to low pressure drain 54. However, the hold-in current is not sufficient to cause any change in the position of intensifier spool valve member 78, which remains in its open position with actuation fluid cavity 51 open to high pressure actuation fluid inlet 50. When intensifier spool valve member 78 is in its open position, actuation fluid flows through inlet 50 into the hollow interior 80 of intensifier spool valve member 78, through radial openings 81, and then simultaneously into connection passage 70 and actuation fluid cavity 51.

Referring now to FIGS. 5–7, a two-way solenoid fuel injector 14' is presented as an alternative to the three-way solenoid fuel injector 14 just described. Fuel injector 14' utilizes a single two-way solenoid 130 to alternately open actuation fluid cavity 109 to actuation fluid inlet 106 or low pressure actuation fluid drain 104, and uses the same solenoid 130 to control the exposure of a needle control chamber 118 to a low pressure passage or a source of high pressure fluid. Fuel injector 14' could be substituted in for the injectors 14 shown in FIG. 1 since both injectors perform substantially similar while one uses a single three-way solenoid and the other uses a single two-way solenoid to accomplish the same tasks. The single two-way solenoid of injector 14' accomplishes what the three-way solenoid of injector 14 does by exploiting a hysteresis effect in the actuation fluid control valve versus the quick response of the needle valve member to the needle control valve.

Injector 14' includes an injector body 105 having an actuation fluid inlet 106 that is connected to a branch rail passage 40, an actuation fluid drain 104 that is connected to actuation fluid recirculation line 27 and a fuel inlet 120 connected to a fuel supply passage 44. (See FIG. 1). Injector 14' includes a hydraulic means for pressurizing fuel within the injector during each injection event and a needle control valve that controls the opening and closing of nozzle outlet 117.

The hydraulic means for pressurizing fuel includes an actuation fluid control valve that includes two-way solenoid 130 which is attached to a pin 135. An intensifier spool valve member 140 responds to movement of pin 135 and ball valve member 136 to alternately open actuation fluid cavity 109 to actuation fluid inlet 106 or low pressure drain 104. Actuation fluid cavity 109 opens to a stepped piston bore 110, 115 within which an intensifier piston 150 reciprocates between a return position (as shown) and a forward position. Injector body 105 also includes a plunger bore 111, within which a plunger 153 reciprocates between a retracted position (as shown) and an advanced position. A portion of plunger bore 111 and plunger 153 define a fuel pressurization chamber 112, within which fuel is pressurized during each injection event. Plunger 153 and intensifier piston 150 are returned to their retracted positions between injection events under the action of compression spring 154. Thus, the hydraulic means for pressurizing fuel includes the fuel pressurization chamber 112, plunger 153, intensifier piston 150, actuation fluid inlet 106, actuation fluid cavity 109 and the various components of the actuation fluid control valve, which includes solenoid 130, ball 136, pin 135 and intensifier spool valve member 140, etc.

Fuel enters injector 14' at fuel inlet 120 and travels past ball check 121, along a hidden fuel supply passage 124, and into fuel pressurization chamber 112, when plunger 153 is retracting. Ball check 121 prevents the reverse flow of fuel from fuel pressurization chamber 112 into the fuel supply passage during the plunger's downward stroke. Pressurized fuel travels from fuel pressurization chamber 112 via a connection passage 113 to nozzle chamber 114. A needle valve member 160 moves within nozzle chamber 114 between an open position in which nozzle outlet 117 is open and a closed position in which nozzle outlet 117 is closed. In this embodiment, needle valve member 160 includes a lower needle portion 161 and an upper intensifier portion 162 separated by spacers 164 and 166, which are all machined as separate components but could be machined as a single integral piece if spring 165 were relocated. Needle valve member 160 is mechanically biased to its closed position by a compression spring 165. Unlike the previous embodiment, compression spring 165 is compressed between spacer 164 and intensifier portion 162. Thus, in this embodiment, when needle valve member 160 is closed and needle control chamber 118 is open to low pressure, intensifier portion 162 is pushed to its upper stop.

Needle valve member 160 includes opening hydraulic surfaces 163 exposed to fluid pressure within nozzle chamber 114 and a closing hydraulic surface 167 exposed to fluid pressure within needle control chamber 118. As in the previous embodiment the closing hydraulic surface and the opening hydraulic surfaces are sized and arranged such that the needle valve member 160 is hydraulically biased toward its closed position when the needle control chamber 118 is open to a source of high pressure fluid. Thus, there should be adequate pressure on the closing hydraulic surface 167 to maintain nozzle outlet 117 closed despite the presence of high pressure fuel in nozzle chamber 114 that is otherwise above a valve opening pressure. The opening hydraulic surfaces 163 and closing hydraulic surface 167 are also preferably sized and arranged such that needle valve member 160 is hydraulically biased toward its open position when the needle control chamber 118 is connected to a low pressure passage and the fuel pressure within nozzle chamber 114 is greater than the valve opening pressure.

The actuation fluid control valve of injector 14' can be thought of as including two-way solenoid 130 that is attached to a pin 135 which is normally in contact with ball 136 except when pin 135 is fully retracted. Pin 135 is biased by a compression spring 138 and the hydraulic force on ball 136 toward a retracted position. In this position, ball 136 closes seat 172 and opens seat 173 so that high pressure actuation fluid flows into contact with the end hydraulic surface 141 of intensifier spool valve member 140. When solenoid 130 is de-energized, actuation fluid cavity 109 is opened to actuation fluid drain 104 past seat 170, and intensifier spool valve member 140 is hydraulically balanced and forced down, as shown, to close seat 171 and open seat 170. When solenoid 130 is energized, pin 135 moves downward causing ball 136 to open seat 172 and close seat 173. This causes end hydraulic surface 141 to be exposed to the low pressure in drain passage 129, which is connected to a second drain 108. This creates a hydraulic imbalance in intensifier spool valve member 140 causing it to move upward against the action of compression spring 145 to close seat 170 and open seat 171. This allows actuation fluid to flow from inlet 106, into the hollow interior 147 of intensifier spool valve member 140, through radial openings 146, past seat 171 and into actuation fluid cavity 109 to act upon the stepped top 155, 156 of the intensifier piston 150.

The opening and closing of the nozzle outlet 117 via needle valve member 160 is controlled by the needle control valve which includes solenoid 130. As stated earlier, when de-energized, pin 135 retracts under the action of compression spring 138 so that high pressure actuation fluid flowing through hollow interior 147 pushes ball 136 to open seat 173 and close seat 172. When in this configuration, the high pressure actuation fluid inlet 106 flows past seat 173 along a hidden passage into actuation fluid control passage 119. Actuation fluid control passage 119 opens to needle control chamber 118 and acts upon the closing hydraulic surface 167 of needle valve member 160, pushing the same downward to close nozzle outlet 117. When solenoid 130 is energized, pin 135 is moved downward pushing ball 136 to close seat 173 and open seat 172. This opens actuation fluid control passage 119 to the low pressure within drain passage 129, which is connected to second low pressure fluid drain 108. Drains 104 and 108 merge together outside of injector body 105. Thus, with the solenoid 130 energized, the closing hydraulic surface 167 of needle valve member 160 is now exposed to a low pressure passage and the needle valve member begins to behave like a simple check valve in that it will now open if fuel pressure within the nozzle chamber 114 is greater than a valve opening pressure sufficient to overcome return spring 165. In this embodiment, the needle control valve includes solenoid 130, pin 135, ball 136, seat 172 and seat 173. The actuation fluid control valve includes all the components of the needle control valve plus intensifier spool valve member 140, compression spring 145, seat 170 and seat 171.

INDUSTRIAL APPLICABILITY

Referring now to the fuel injector 14 illustrated in FIGS. 2–4, each injection sequence is started by applying pull-in current to solenoid 75 in order to move pin spool valve member 76 to the left. Oil pressure that entered the injector and was trapped at seat 59 is now able to push ball valve 53 to close seat 61. High pressure oil can flow past seat 59 through cross grooves in the back side of intensifier spool valve member 78 to act on end hydraulic surface 79. The intensifier spool valve member 78 is now pressure balanced and spring 82 moves it to the right. This opens seat 55 and closes seat 57. The main oil supply can flow through radial openings 81, past seat 55, into actuation fluid cavity 51 to the top of intensifier piston 83, starting it moving downward. Oil is also flowing through a connection passage 70 to the pin spool valve member 76. With the movement of pin spool valve member 76, seat 67 opens and seat 65 closes causing the high pressure in transfer passage 70 to be connected to actuation fluid control passage 71. The high pressure acting on closing hydraulic surface 88 holds needle valve member 86 in its closed position. With intensifier piston 83 and plunger 85 moving downward, fuel pressure starts to build within fuel pressurization chamber 64, closing ball check 65.

In order to provide direct control of needle valve member 86, the solenoid pull-in current is reduced to its hold-in current after fuel pressure reaches valve opening pressure. By providing two force levels from the solenoid (pull-in and hold-in) a different injection characteristic takes place. Dropping back to a hold-in current from the initial pull-in current causes the pin spool valve member 76 to close seat 67 and open seat 65. Hold-in current will provide enough force to prevent the solenoid spring 77 from pushing ball valve 53 off of seat 61. The high pressure oil can no longer flow past seat 67 into actuation fluid control passage 71 to pressurize needle control chamber 72. If the solenoid hold-in current is maintained, fuel pressure within nozzle chamber 62 will build via its connection passage 69 to fuel pressurization chamber 64 until a valve opening pressure (VOP) is reached and the needle valve member opens against the action of needle return spring 89.

With the full pull-in current being applied, fuel pressure continues to build from the intensifier piston 83 and plunger 85 moving downward (or stopped at a point where the fuel is fully compressed rendering the plunger hydraulically locked), but the needle valve member 86 will not open because high pressure oil is allowed to flow into needle control chamber 72 to act on closing hydraulic surface 88 of needle valve member 86. This pressure on needle valve member 86 provides a force required to keep it closed. To open needle valve member 86, solenoid 75 changes from pull-in current to its lower hold-in current. The needle control chamber is opened to the low pressure of drain 54 past seat 65. This removes the force keeping the needle valve member closed, and now it opens allowing fuel to exit nozzle chamber 62 through nozzle outlet 63. Fuel injection can be paused or temporarily halted by returning the solenoid current to its pull-in level. This re-pressurizes the closing hydraulic surface 88 of needle valve member 86 causing it to close. This direct control of needle valve member 86 allows the nozzle outlet to be opened and closed any number of times during each injection cycle without affecting the hydraulic pressurizing means.

To end injection and allow the injector to refuel itself for the next cycle, solenoid 75 is de-energized. This causes actuation pin spool valve member 76 to close seat 67 and open seat 65. This releases the pressurized oil acting on closing hydraulic surface 88. The solenoid spring 77 causes the actuation valve member 76 to push ball valve 53 from seat 61 back to close seat 59. The high pressure oil supply is closed off at seat 59 and oil pressure on the hydraulic end surface 79 of intensifier spool valve member 78 is released past seat 61 to low pressure drain 54. Intensifier spool valve member 78 is again hydraulically unbalanced causing it to move left against the action of spring 82 to close seat 55 and open seat 57. This releases pressurized oil acting on top of intensifier piston 83 by opening actuation fluid cavity 51 to low pressure drain 52 past seat 57. The intensifier piston 83 and plunger 84 are then returned upward by return spring 84. The lowering fuel pressure causes ball check 68 to open and allow replenishing fuel to flow into fuel pressurization chamber 64.

Changing the current levels from pull-in to hold-in creates true freedom for delivering fuel during the injection cycle. An injection characteristic tailored to specific engine operating conditions can be obtained. This injection system provides the ability to vary injection pressures by controlling the pressure of the actuation fluid and provides the ability to control injection characteristics through the direct control of the needle valve member. The direct control of the needle valve member allows the computer to control when the needle valve member is opened at any pressure between valve opening pressure and a maximum injection pressure. This provides a significant amount of control over initial injection mass flow rate in order to produce some rate shaping, if desired. At the same time, the direct control aspects of the present invention allow for a desirable abrupt end to injection by providing the means by which the needle valve member can be quickly closed at any desired time.

Referring now to the injector 14' illustrated in FIGS. 5–7 and the graphs of FIGS. 8 and 9, each injection sequence is started by energizing the solenoid 130 in order to move ball 136 to open seat 172 and close seat 173. The pressurized fluid previously acting on the end hydraulic surface 141 of spool valve member 140 can drain past seat 172. Intensifier spool valve member 140 is now hydraulically imbalanced and begins to move upward against the action of compression spring 145. This opens seat 171 and closes seat 170. The main oil supply can now flow through radial openings 146, past seat 171, into actuation fluid cavity 109 to the top of intensifier piston 150, starting it moving downward. With intensifier piston 150 and plunger 153 moving downward, fuel pressure starts to build within fuel pressurization chamber 112, closing ball check 121. With the solenoid energized, needle control passage 119 is open to low pressure drain 129 such that needle valve member 160 will open when fuel pressure exceeds a valve opening pressure sufficient to compress return spring 165.

Since only the inner top portion 155 of intensifier piston 150 is exposed to the high pressure oil in actuation fluid cavity 109, the intensifier piston accelerates downward at a rate lower than it otherwise would if the full fluid pressure were acting over the complete top surface of the intensifier piston. The volume above annular top surface 156 of intensifier piston 150 is filled by fluid flowing through auxiliary passage 128. As the intensifier piston continues to move downward, it eventually reaches a point where the volume above space 156 is growing faster than fluid can be supplied via passage 128. This causes a momentary hesitation in the piston's downward movement resulting in a slower build-up of fuel pressure underneath plunger 153 in fuel pressurization chamber 112.

Figure 8A:
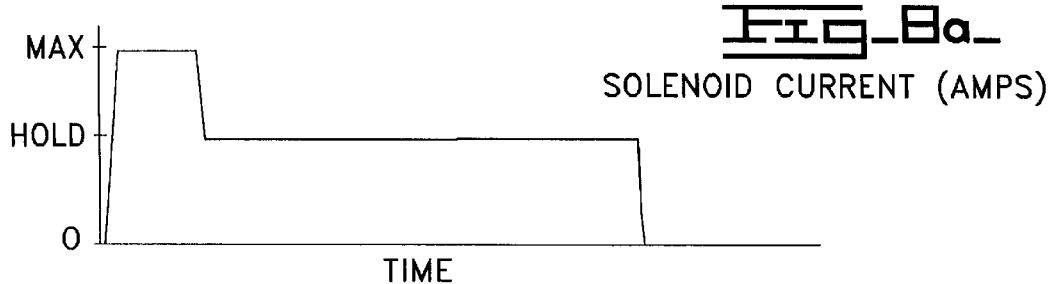
FIGS. 8a–e are a group of curves showing component positions and injection parameters versus time over a single "ramp-square" injection event.
Figure 8B:
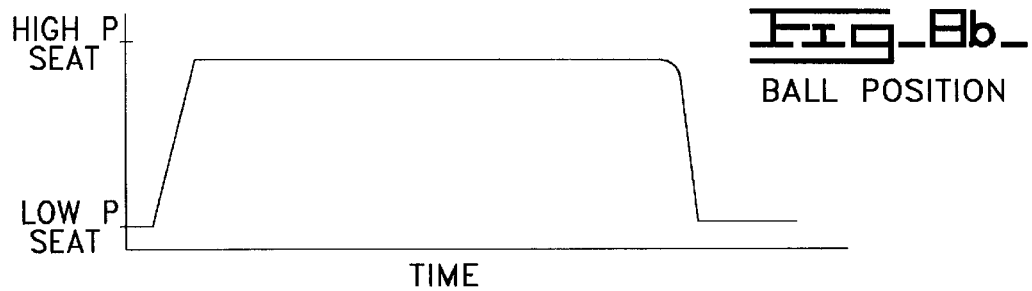
Figure 8C:
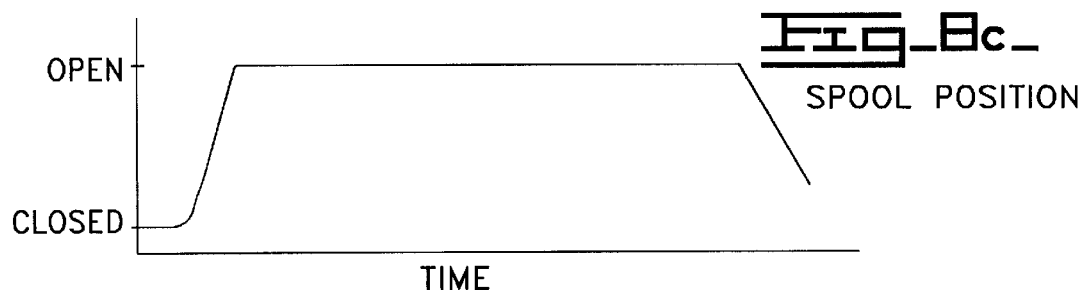
Figure 8D:
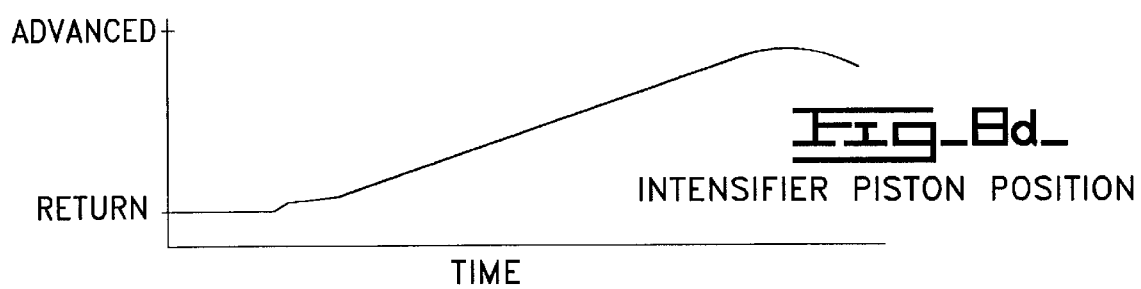
Figure 8E:
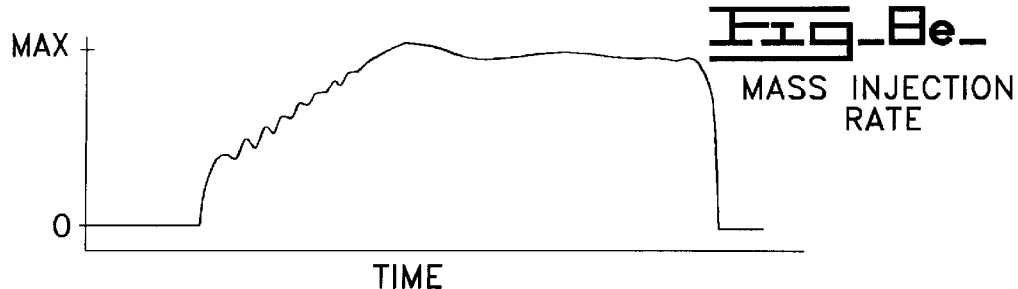

If a "ramp-square" injection profile of the type shown in FIG. 8e is desired, current to solenoid 130 is continued as shown in FIG. 8a throughout the duration of the injection event. After the ball and spool have moved as shown in FIGS. 8b and 8c due to the initial energization of solenoid 130, the solenoid current is dropped to a hold-in current which keeps the solenoid pin in its same position yet saves energy since less energy is required to hold pin 135 in this position. Because of the slower acceleration and hesitation produced in the movement of intensifier piston 150 by the use of a stepped top in a stepped bore, the initial mass injection rate desirably ramps upward in a way that improves exhaust emissions over certain engine operating conditions.

To end injection and allow the injector to re-fuel itself for the next cycle, solenoid 130 is de-energized. This causes ball 136 to open seat 173 and closes seat 172. This resumes the pressurized oil acting on closing hydraulic surface 167 and, with the help of return spring 165, causes needle valve member 160 to close and provide an abrupt end to the injection. The opening of seat 173 causes intensifier spool valve member 140 to again become hydraulically balanced so that compression spring 145 moves the same downward to close seat 171 and open seat 170. This allows actuation fluid in actuation fluid cavity 109 to drain into actuation fluid drain 104 so that intensifier piston 150 and plunger 153 can retract under the action of return spring 154. The lowering of fuel pressure within fuel pressurization chamber 112 causes ball check 121 to open. Replenishing fuel begins to flow into the injector for the next injection event. Thus, in this injector, simple energizing and de-energizing of the solenoid will result in a ramped initial injection rate due to the intensifier piston stepped top and an abrupt end to injection due to the direct needle valve member control features of the present invention.

The present invention is capable of far more complex injection rate profiles than that illustrated in FIG. 8e. For instance, the graphs in FIGS. 9a–9e show that, as an example, the injector 14' can be made to produce a pilot injection segment C followed by a "square" main injection segment E. In order to produce such an injection rate profile, solenoid 130 is initially energized with a maximum current so that ball 136 moves to open seat 172 and close seat 173. Shortly after the ball moves, the intensifier spool valve member begins to move from its closed position to its open position so that high pressure actuation fluid begins to flow into actuation fluid cavity 109 beginning the piston and plunger moving in their downward stroke. When fuel pressure within nozzle chamber exceeds the valve opening pressure sufficient to compress return spring 165, the needle valve member briefly opens to allow pilot injection segment C to occur.

In order to produce a split injection, the solenoid is briefly de-energized a sufficient amount of time that the ball 136 moves back to its original position to open seat 173 and close seat 172. This again pressurizes the closing hydraulic surface of needle valve member 160 causing it to close. At the same time, intensifier spool valve member becomes hydraulically balanced and begins to move to close seat 171. However, because spring 145 is relatively weak, the intensifier spool valve member moves rather slowly. Before intensifier spool valve member moves sufficiently far to close seat 171, the solenoid is again energized causing ball 136 to again close seat 173 and re-open seat 172. This allows needle valve member to re-open with fuel pressure substantially higher than the valve opening pressure in order to provide an abrupt beginning, or "square" to the injection. At the same time, intensifier spool valve member reverses direction as in segment D (FIG. 9c) and returns to its fully open position. Thus, since ball 136 and needle valve member 160 can react far quicker to the movement of solenoid 130, the needle control valve can be opened and closed faster than the intensifier spool valve member can react to close seat 171.

Those skilled in the art will appreciate that a wide variety of mass injection rate profiles can be created with the present invention. For example, a simple "square" injection rate profile can be created by de-energizing the solenoid before fuel pressure in the nozzle chamber reaches the valve opening pressure, and then re-energizing the solenoid before intensifier spool valve member 140 is moved to close seat 170, but after fuel pressure has reached a desired injection pressure above the valve opening pressure. Those skilled in the art will also appreciate that by choosing specific mass properties for ball 136 and intensifier spool valve member 140, as well as the strength of spring 145, along with the performance characteristics of solenoid 130, a sufficient time lag can be created in the reaction of the spool valve member in order to allow direct control of the needle valve member in an injector having only a single two-way solenoid while maintaining adequate control of the hydraulic pressurizing means.

The subject invention is capable of varying peak fuel injection pressure independent of engine speed and load. The subject invention is capable of variably controlling the fuel quantity of each separate fuel injection segment during an injection cycle. The invention is also capable of variably controlling each time interval between each separate fuel injection segment during an injection cycle. Moreover, the injector solenoid can be energized and de-energized once or a selected plurality of times during an injection cycle to produce one or a variably-selected plurality of injection segments.

Other aspects, objects, and advantages of this invention can be obtained from a study of the drawings, the disclosure, and the appended claims.

What is claimed is:

1. A hydraulically actuated fuel injector comprising:
   an injector body defining an actuation fluid inlet, an actuation fluid cavity, a nozzle outlet, and a needle control chamber;
   a solenoid attached to said injector body;
   a first valve member mounted in said injector body and being movable in response to said solenoid between a first position in which said actuation fluid inlet is open to said actuation fluid cavity and a second position in which said actuation fluid inlet is closed to said actuation fluid cavity;
   a needle valve member mounted in said injector body and being movable between an open position in which said nozzle outlet is open and a closed position in which said nozzle outlet is blocked, and said needle valve member having a closing hydraulic surface exposed to pressure in said needle control chamber; and
   a second valve member mounted in said injector body and being movable in response to said solenoid, while said actuation inlet is open to said actuation fluid cavity, between an off position in which said needle control chamber is open to a source of high pressure fluid and an on position in which said needle control chamber is open to a low pressure passage.

2. The fuel injector of claim 1, wherein said source of high pressure fluid is said actuation fluid inlet;
   said injector body defines an actuation fluid drain; and
   said low pressure passage is said actuation fluid drain.

3. The fuel injector of claim 1, wherein said second valve member is a ball valve member; and said first valve member is a spool valve member.

4. The fuel injector of claim 1 wherein said first valve member includes an end hydraulic surface and is biased toward one of said first position and said second position by a compression spring; and
   said end hydraulic surface is exposed to pressure in said actuation fluid inlet when said ball valve member is in one of said off position and said on position.

5. The fuel injector of claim 1 wherein said needle valve member is biased toward said closed position when said first valve member is in said first position and said second valve member is in said off position.

6. The fuel injector of claim 1 wherein said solenoid is a two position solenoid with an armature attached to a pin moveable between positions in and out of contact with said second valve member;
   said second valve member is a ball valve member; and
   said first valve member is a spool valve member.

7. The fuel injector of claim 1 further comprising a pin attached to said solenoid;
   said second valve member being in contact with said pin when in said on position, but being out of contact with said pin when in said off position.

8. The fuel injector of claim 1 wherein said first valve member is biased toward said second position by a compression spring; and
   said compression spring is sufficiently weak that said second valve member can move from said on position to said off position, stay at said off position for an amount of time and move back to said on position before said first valve member can move from said first position to said second position.

9. The fuel injector of claim 8, wherein said second valve member is a ball valve member; and said first valve member is a spool valve member.

10. A fuel injection system comprising: a plurality of hydraulically actuated fuel injectors with direct control needle valves, each injector having an injector body defining an actuation fluid inlet, a fuel supply passage and a needle control chamber; a needle valve member movably mounted in said injector body and having a closing hydraulic surface exposed to pressure in said needle control chamber; and further having a relatively slow moving actuation fluid control valve member and a relatively fast moving needle control valve member;

a source of low pressure fluid connected to said fuel supply passage; and a source of high pressure fluid connected to said actuation fluid inlet.

11. The fuel injection system of claim 10 wherein said actuation fluid control valve member and said needle control valve member move in response to a two-position solenoid attached to said injector body.

12. The fuel injection system of claim 10 wherein said low pressure fluid is fuel fluid; and said high pressure fluid is a lubricating oil fluid.

13. The fuel injection system of claim 10 wherein said actuation fluid control valve member is a spool valve member; and said needle control valve member is a ball valve member.

14. The fuel injection system of claim 10 wherein each of said plurality of hydraulically actuated fuel injectors includes:

a two-position solenoid attached to said injector body;

said actuation fluid control valve member being positioned in said injector body and movable in response to said solenoid between a first position in which said actuation fluid inlet is open and a second position in which said actuation fluid inlet is closed;

said needle control valve member being positioned in said injector body and movable in response to said solenoid between an off position in which said needle control chamber is opened to a source of high pressure fluid and an on position in which said needle control chamber is opened to a low pressure passage.

15. The fuel injection system of claim 10, wherein said needle valve member is biased toward a closed position when said actuation fluid control valve member opens said actuation fluid inlet and said needle control valve member opens said needle control chamber to a high pressure passage.

16. The fuel injection system of claim 10 wherein said needle control valve member can move from an on position to an off position, stay at said off position for an amount of time and move back to said on position before said actuation fluid control valve member can move from first position that opens said actuation fluid inlet to a position that closes said actuation fluid inlet.

17. The fuel injection system of claim 10, wherein said actuation fluid control valve member includes an end hydraulic surface; and said end hydraulic surface is exposed to pressure in said actuation fluid inlet when said needle control valve member is in one of an off position and an on position.

18. A hydraulically actuated fuel injector comprising:

an injector body defining an actuation fluid inlet, an actuation fluid cavity, and a needle control chamber;

a two position electrical actuator attached to said injector body;

a relatively slow moving actuation fluid control valve member mounted in said injector body and being movable in response to said actuator to open and close said actuation fluid inlet to said actuation fluid cavity;

a needle valve member movably mounted in said injector body and having a closing hydraulic surface exposed to pressure in said needle control chamber; and a relatively fast moving needle control valve member mounted in said injector body and being movable in response to said actuator to open and close said needle control chamber to a source of high pressure fluid.

19. The fuel injector of claim 18 wherein said needle control valve member can move from an on position to an off position, stay at said off position for an amount of time and move back to said on position before said actuation fluid control valve member can move from an open position to a closed position.

20. The fuel injector of claim 19 wherein said needle valve member is biased toward a closed position when said actuation fluid control valve member opens said actuation fluid inlet and said needle control valve member opens said needle control chamber to a high pressure passage.

* * * * *